United States Patent [19]
Gainand

[11] Patent Number: 5,510,595
[45] Date of Patent: Apr. 23, 1996

[54] MACHINE FOR AUTOMATIC IN SITU WELDING ACCORDING TO A CURVILINEAR SECTION PROFILE AND HAVING PROGRAMMABLE EXTRAPOLATION CONTROL

[75] Inventor: Yves F. G. Gainand, Montigny le Bretonneux, France

[73] Assignee: Societe Nouvelle Technigaz, Montigny le Bretonneux, France

[21] Appl. No.: 318,667

[22] PCT Filed: Feb. 10, 1994

[86] PCT No.: PCT/FR94/00157

§ 371 Date: Oct. 11, 1994

§ 102(e) Date: Oct. 11, 1994

[87] PCT Pub. No.: WO94/17952

PCT Pub. Date: Aug. 18, 1994

[30] Foreign Application Priority Data

Feb. 12, 1993 [FR]  France ................................. 93 01619

[51] Int. Cl.$^6$ ....................................................... B23K 9/12
[52] U.S. Cl. ................................... 219/124.34; 219/125.1
[58] Field of Search .................... 219/124.34, 124.31, 219/125.1, 125.11; 395/87

[56] References Cited

U.S. PATENT DOCUMENTS

| | | | |
|---|---|---|---|
| 4,008,384 | 2/1977 | Cecil | 219/124.31 |
| 4,296,306 | 10/1981 | Nomura et al. | 219/124.34 |
| 5,006,999 | 4/1991 | Kuno et al. | 395/88 |
| 5,276,777 | 1/1994 | Hara | 395/87 |

FOREIGN PATENT DOCUMENTS

| | | |
|---|---|---|
| 0266424 | 5/1988 | European Pat. Off. . |
| 0323279 | 7/1989 | European Pat. Off. . |
| 0512583 | 11/1992 | European Pat. Off. . |
| 0520894 | 12/1992 | European Pat. Off. . |
| 0520893 | 12/1992 | European Pat. Off. . |

OTHER PUBLICATIONS

Drews et al, "Echtzeit–Bahnpanung eines Roboters . . . ", Robotersysteme, vol. 5, No. 4, pp. 213–218, Dec. 1989.

*Primary Examiner*—Clifford C. Shaw
*Attorney, Agent, or Firm*—Leydig, Voit & Mayer

[57] ABSTRACT

A machine for automatically welding parts which need to be assembled has detection means which include a locating telemeter capable of measuring a selected distance between the machine and one of the parts. A programmable control device is provided with a memory wherein are stored the coordinates of the passing points of a welding torch. The coordinates are distributed on a curvilinear section of a welding profile. The machine includes first calculation means for determining the location of the passage points and for defining, by circular extrapolation, a series of points defining the curves joining the passage points and corresponding to the curvilinear section, so that a shifting system matches the successive positions of the torch with the section. The invention is suitable for in situ welding, for example to produce membranes for fluid confinement tanks.

14 Claims, 3 Drawing Sheets

MACHINE FOR AUTOMATIC IN SITU WELDING ACCORDING TO A CURVILINEAR SECTION PROFILE AND HAVING PROGRAMMABLE EXTRAPOLATION CONTROL

BACKGROUND OF THE INVENTION

The present invention relates to an automatic machine for the welding of metallic parts which one desires to assemble. More precisely the invention relates to a machine operated by a programmable control device and capable of carrying out "in situ" welds along a profile common to the parts to be assembled and comprising at least one curvilinear portion.

One has already proposed various automatic machines permitting to assemble through welding at least two metallic parts along a common profile. In general each machine comprises a support stationary with respect to the parts to be assembled and on which a robot or carriage is mounted and guided along a "feed" path of travel. A suitable welding equipment forms part of the machine and in particular comprises a torch apt to provide weld points and/or weld beads. The torch itself is movably mounted and guided on the carriage whereas a displacement system is provided to drive the torch as well as the carriage in their guiding directions or paths of travel with respect to the stationary support. Means for the detection of the position of the torch with respect to the parts as well as a programmable control device controlling the displacement system and the welding equipment are provided in the machine. The control device is connected to the detection means and determines as a function of the information supplied by the latter each displacement of the torch in order that a weld be performed along the common profile of the parts.

However, the welding machines of the prior art frequently use mechanical contact sensors (such as feelers, followers etc . . .) to detect and adjust the position of the welding torch. Therefore and above all in the case where this welding is entirely automatic and where the profile comprises curvilinear portions, the machines of the prior art prove themselves to be relatively inaccurate and do not permit to quickly obtain a quality weld. Moreover most of the known welding machines are heavy and cumbersome, so that they are difficult to be used for the welding of parts on the spot or "in situ", i.e. at the very position where these parts will be used.

SUMMARY OF THE INVENTION

Therefore the present invention has as its object to propose an automatic "in situ" welding machine which is precise, quick and light in order to cope with the above-recited inconveniences of the prior art.

For that purpose the invention has as its subject an automatic machine for the "in situ" assembling of at least two metallic parts through welding along a profile common to the parts and of the type comprising a support stationary with respect to the parts, a carriage movably mounted on this support and guided along a feed path of travel, a welding equipment with a torch or the like movably mounted and guided on the carriage, a system for the displacement of the carriage and of the torch with respect to the support, means for the detection of the position of the torch with respect to the parts as well as a programmable control device which is connected to the detection means and which controls the displacement system and the welding equipment in order that a weld be carried out by the torch along the said common profile, characterized in that the detection means comprise a locating telemeter apt to measure a chosen distance between the machine and one of the parts, the said profile exhibiting at least one curvilinear portion at the level where the chosen distance is outside of a given range, the automaton being provided with a memory wherein are recorded the coordinates of points of passage distributed on the curvilinear portion and in that the control device possesses first calculation means which permit on the one hand to determine the location of the points of passage on the profile as a function of the locating telemeter and on the other hand to define through circular extrapolation between the neighbouring points of passage, series of curves connecting these points and substantially coinciding with the curvilinear portion, in order that the displacement system causes one of the successive positions of the torch at the level of the curvilinear portion to correspond to a given number of points of these curves.

According to another characteristic, the torch is made fast to a plate mounted onto the carriage for sliding in an direction of elevation substantially parallel to the distance measured by the locating telemeter and perpendicular to the aforesaid feed path of travel, the drive system comprising a first drive member such as a step motor co-operating with the stationary support and made fast to the carriage in order to displace the latter along the said path of travel as well as a second drive member made fast to the carriage and cooperating with the plate so as to displace the latter and therefore the torch along the said direction of elevation.

Moreover the control device is provided with second calculation means which operate alternately with the aforesaid first means when the torch is located at the level of a rectilinear portion of the profile and determines a series of aligned points corresponding to the successive positions of the torch at the level of this portion, through linear extrapolation and as a function of a position of initialization of the displacement of the torch.

According to still another characteristic, the torch is mounted on the carriage (or on the aforesaid plate) through the medium of an element sliding in a direction of following perpendicular to the feed path of travel as well as at the distance measured by the locating telemeter, the displacement system being provided with a third drive member such as a step motor or the like arranged so as to drive the torch on either side of the profile in the direction of following, alternately in one direction and then in the opposite direction and in that the detection means comprise a tracking telemeter made fast to the torch and apt to sense the presence of the profile being plumb with the torch, the said third drive means being interlocked in follow-up relationship with the tracking telemeter in order that at each detection by the latter of the profile, the direction of driving of the torch by this member be reversed.

Advantageously the locating and tracking telemeters will be constituted by a detection head mounted on the carriage and provided with an emitter as well as with a receiver of laser beams and by a control box connecting the aforesaid automaton to the head, the latter being disposed in order that the beams be reflected by one or the other one of the parts to be assembled and that the distance to be measured or the presence to be sensed be determined according to the diameter and/or the wavelength of the reflected beams.

According to an embodiment the torch is mounted on the carriage through the medium of a directional swivelling joint, this swivelling joint permitting a rotation of the torch with respect to the stationary support about an axis substantially perpendicular to the feed path of travel and at the distance measured by the locating telemeter and in that the displacement system comprises a fourth drive member made fast to the swivelling joint and co-operating with the torch in order that the orientation of the latter at the level of each point of the curvilinear portion of the profile be kept approximately constant with respect to the tangent to the corresponding curve defined by the aforesaid first calculation means and at the level of each rectilinear portion.

In addition the invention characterizes itself in that the detection means comprise an adjusting sensor apt to determine a spacing between the profile and the torch, the latter being mounted onto a slide member made fast to the carriage for sliding in an adjusting direction comprised in a plane substantially parallel to the feed path of travel and to the distance measured by the aforesaid locating telemeter, the displacement system comprising a fifth drive member itself made fast to the slide member and interlocked in follow-up relationship with the adjusting sensor in order to keep the said spacing substantially constant as a function of a predetermined set value.

Preferably the torch is an electric arc welding torch advantageously without any filler material and with a flux of inert gas such for example as a torch with a tungsten electrode and a flux of argon or a plasma torch.

In this case the aforesaid adjusting sensor could be constituted by a voltmeter apt to determine the spacing between the profile and the torch according to the voltage of the arc produced by the latter, the set value being a predetermined value of the voltage of the welding arc.

According to still another characteristic of the invention, the stationary support comprises quick anchoring mechanisms such as blocking tongs, a suction cup or the like and owing to which the support may be positioned and fastened in a removable manner onto at least one of the parts to be assembled.

Furthermore the invention is characterized in that the stationary support is constituted by a rail for example of sectional aluminium the longitudinal direction of which coincides with the aforesaid feed path of travel.

Then a toothed rack co-operating with a pinion made fast to for rotation with the first drive member as well at least one guiding strip co-operating with rollers mounted for rotation on the carriage are fastened to the aforesaid rail along its longitudinal direction.

In the machine according to the invention the control device as well as a control board of the machine are grouped in a cabinet for example mounted on caster wheels, this cabinet being connected by flexible cords on the one hand to a remote-control desk and to the carriage and on the other hand in particular to a so-called stationary section of the welding equipment to which the torch is also connected by a flexible cord.

BRIEF DESCRIPTION OF THE DRAWINGS

But further characteristics and advantages of the invention will appear better in the detailed description of an embodiment given by way of example only, which follows and refers to the attached drawings, in which.

DESCRIPTION OF THE PREFERRED EMBODIMENTS

Referring to FIGS. 1, 4, 5 and 7, one sees an automatic machine 1 permitting to assemble at least two metallic parts such as P1 and P2 along a profile P which is common to the various part to be assembled.

The machine 1 comprises a support 2 stationary with respect to the parts P1 and P2 hence to the profile P. A carriage 3 is movably mounted on the support 2 and is guided by the latter so that it may be displaced in one direction or in the other one along a so-called "feed" path of travel T. A torch 40 which forms part of a welding equipment or station 4 (FIG. 7) is movably mounted and guided on the feed carriage 3. Of course the machine 1 comprises a displacement system 5 owing to which on the one hand the carriage 3 and on the other hand the welding torch 40 may be displaced with respect to the profile P of the parts P1 and P2 along their guides provided between the support 2, the carriage 3 and the torch 40.

Figures 7, 8, 9:
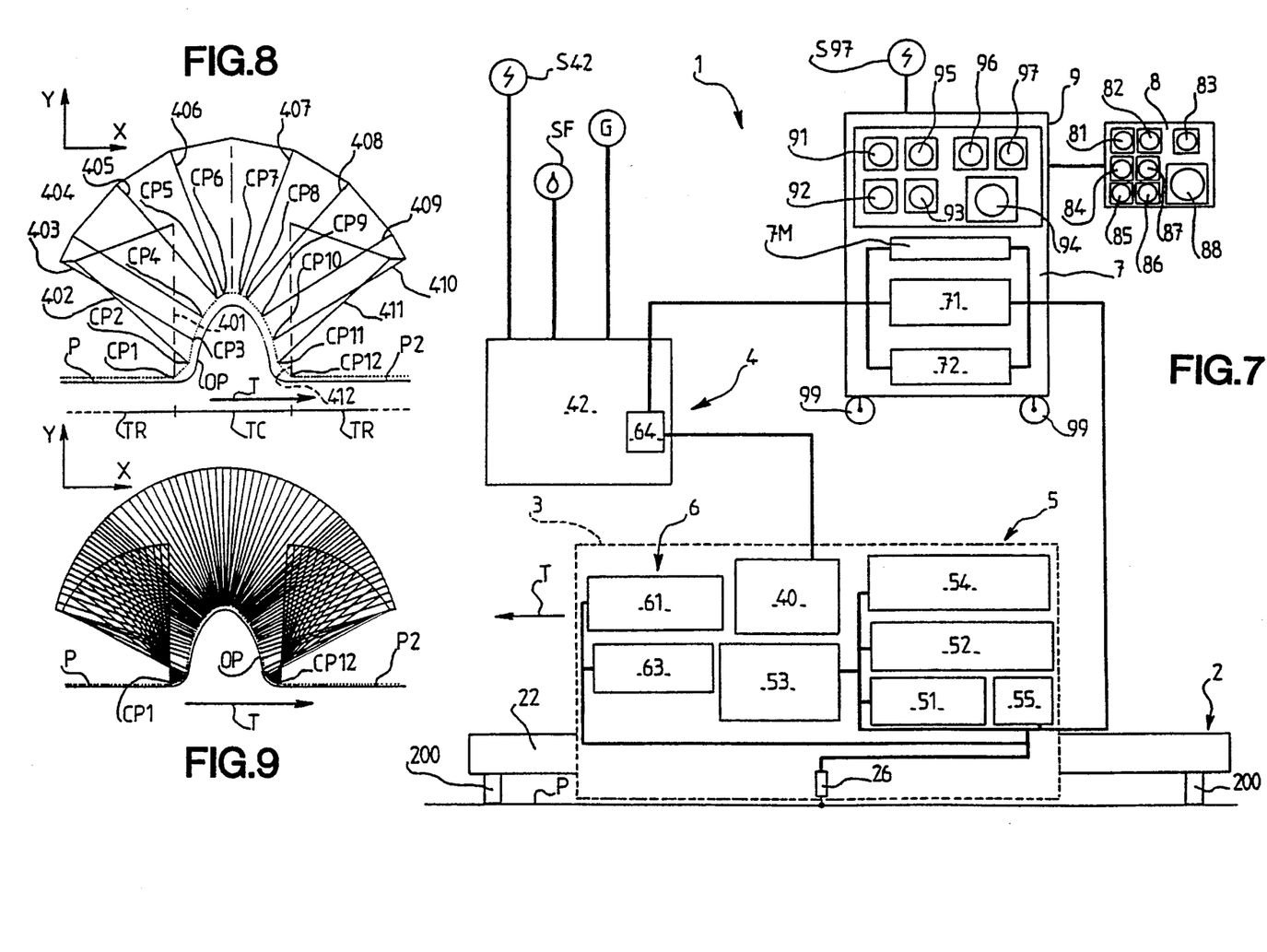
FIG. 7 is a diagrammatic view showing the whole machine according to the invention.
FIG. 8 diagrammatically shows a curvilinear portion of a profile of a part to be welded as well as stored points of passage and the corresponding positions of the welding torch of a machine according to the invention.
FIG. 9 is a view similar to FIG. 8 which illustrates the manner in which the control device extrapolates curves permitting to define each successive position of the torch of the machine according to the invention at the level of the curvilinear portion.

Furthermore the automatic machine 1 is provided with means 6 for the detection of the position of the torch 40 with respect to the parts P1 and P2 to be assembled as well as with a control device 7 visible on FIG. 7. It appears from this figure that the device 7 which is programmable is in particular connected to the detection means 6, to the displacement system 5 and to the welding station 4. In fact the device 7 may control the operation of the system 4 hence of the torch 40 as well as of the system 5 on the basis of information supplied by the detection means 6 among others in order to perform a welding along the profile P.

An embodiment of the welding machine 1 according to the invention will now be explained in detail.

According to the illustrated example, the machine 1 permits to effect "in situ", i.e. on the spot, a weld bead extending between the parts P1 and P2 along the profile P. The parts designated at P1 and P2 are two austenitic steel sheets which form part of a partition, membrane or the like fastened onto one backing layer C through the medium of a plurality of metallic inserts I as one sees it well on FIG. 3. Each insert I is fastened onto the layer C and permits the application of a discontinuous weld F for immobilizing one of the metal sheets P1 or P2 onto the layer C. It is self-understandable that other types of parts as well as other metallic materials may be welded by the machine 1 and that the metal sheets described here constitute a non-limiting example only.

Furthermore one remarks that each metal sheet P1 or P2 comes in contact with the layer C (and possibly an insert I) along a "laying" plane. This laying plane, which may extend vertically, horizontally or according to any other orientation of the layer C, defines two reference axis X and Z forming part of a reference system X, Y, Z with respect to which the machine 1 will be described. The third axis Y of the reference system X, Y,Z is directly perpendicular to the laying plane XZ as this appears well from FIG. 2 in particular.

Still on this figure one remarks that substantially rectilinear bosses OP and OP' with a section in the shape of an inverted U are formed on the metal sheets or parts P1 and P2. These bosses or waves OP and OP' project from the plane X, Z along Y and therefore from that face of the parts P1 and P2 which is opposite to the layer C. The waves OP are nearly parallel to the axis Z and have a dimension or "height" along Y which is smaller than the height of the waves OP'. The waves OP' which are called big waves extend in nearly parallel relation to X hence perpendicularly to the small waves OP. One understands that the metal sheets P1 and P2 form part once they have been assembled of a wall or membrane for example for a fluid confining tank and within which the big and small waves are crossing at right angles to constitute nodes N such as the one which one sees on FIG. 2.

Figures 1, 2, 3, 6:
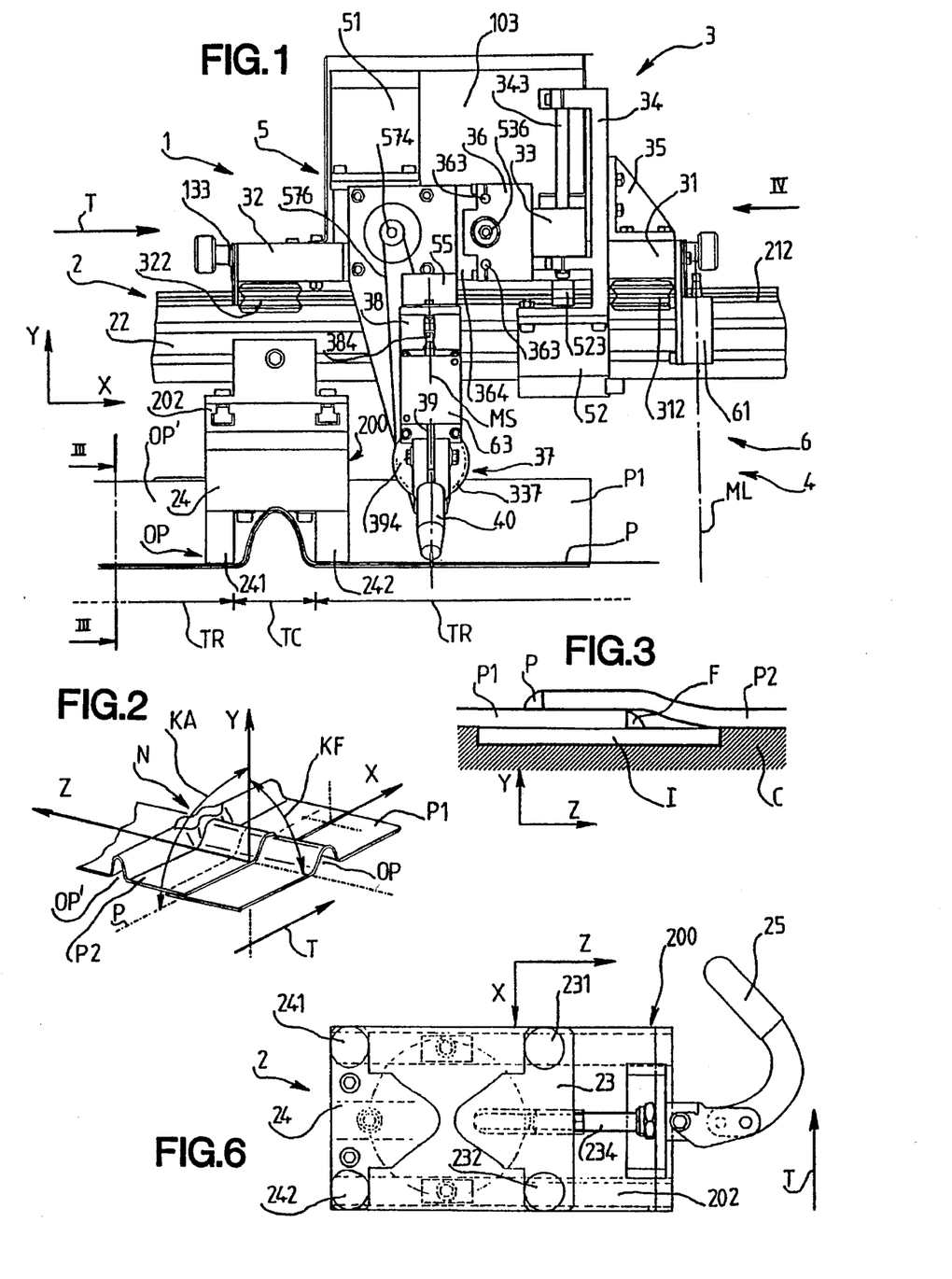
FIG. 1 is partial elevational front view of a machine according to the invention.
FIG. 2 is perspective view of an example of parts to be assembled with the assistance of the machine of FIG. 1 and defining the main reference axes thereof.
FIG. 3 is a view in section along the line III—III of FIG. 1.
FIG. 6 is a partial view along the arrow VI of FIG. 4 and illustrating a quick anchoring system of a machine according to the invention.

When looking at FIGS. 2 and 3, it appears that the metal sheets P1 and P2 are disposed in "overlapping" relationship with respect to each other, i.e. are overlapping. The profile P is defined by the ledge of the upper metal sheet and by the surface, opposite to C, of the lower metal sheet at the level of the overlapping thereof. Here the profile P between the ledge of the metal sheet P2 and the top surface of the metal sheet P1 extends along an envelope plane substantially perpendicular to the laying plane XZ and parallel to Y. Nevertheless it should be noted that contrary to the present example, the envelope of the welding profile may not be flat and that this assumption has been chosen with a view to simplify the present description only. Thus the envelope of the profile along which the machine 1 according to the invention performs a weld may for example be cylindrical, frusto-conical or otherwise.

Similarly one remarks that the feed path of travel T is substantially parallel to the reference axis X on the figures. However one understands that if the envelope of the profile P is not flat, this path of travel T will not be rectilinear.

Furthermore since the profile P extends in nearly parallel relation to X and that the small waves OP are oriented substantially along Z, the profile P exhibits at least one curvilinear portion TC at the level of its intersection with one of these waves. The profile P will of course comprise as many curvilinear portions TC as it crosses waves. Likewise one sees well that this profile P in addition comprises at least one rectilinear portion TR. In fact the profile P possesses at least two rectilinear portions TR which are aligned with one another and substantially parallel to the path of travel T as well as to the axis X.

As stated above, the machine 1 differentiates from the prior art essentially in that the detection means 6 comprise a locating telemeter one sensing head 61 of which permits to measure a chosen distance between the machine 1 and one of the parts P1 or P2 (and possibly both parts) to be welded. This distance is chosen to be comprised outside of a given range at the level of a curvilinear portion TC of the profile P.

Here the locating telemeter is a laser telemeter, i.e. the sensing head 61 of which comprises an emitter of laser beams as well as a receiver and a control case (not shown). The emitter for instance is a semi-conductor laser light source with a power of the order of 5 mW and capable of measuring a chosen distance lower than 100 mm with a precision comprised between 10 µ and 0.7 mm. The head 61 is mounted on the carriage 3 downstream with respect to the torch 40 in the feed direction of the carriage and opposite to the part P1. This head 61 is directed for measuring a distance in the direction designated at ML on FIGS. 1 and 4 which is approximately parallel to the axis Y.

Thus the beams emitted (in an intermittent manner nearly every ms) by the emitter 61 are reflected on the part P1 and sent back to the receiver of the telemeter. The head 61 being connected to the control box (for example disposed near the automaton 7 in a cabinet 9 such as the one which is visible on FIG. 7), the receiver measures the wavelength and/or the diameter of each beam it receives and then transmits to the box an analog signal corresponding to this measurement. the box then indicates through the medium of an analog-digital transcoder a value corresponding to the measurement in question of the control device 7. One should note here that according to the illustrated example, the diameter of the beam detected by the head 61 is of the order of 0.2 to 2 mm whereas its wavelength at the level of the centre of oscillation of the emitter is about 780 nm. Of course other types of telemeters may also be used such as for example an induced current sensor or the like.

One understands that if the beams emitted by the head 61 are reflected by the part P1 when the carriage 3 displaces this head in front of a wave OP or OP', the distance one desires to measure between the emitter and the point of reflection of the emitted beam decreases by a value equal to the dimension along ML (or Y) of this wave. Such a decrease results in proportional variations of the diameter and of the wavelength of the laser beam which are taken into account by the receiver to permit to determine the distance to be measured.

Then on the basis of these variations in distance, it is easy to determine the presence of the location and possibly the type of the wave met by the laser beams. For example if this distance is not comprised within a range the limits of which correspond to the maximum and minimum values of the chosen distance with difference in amplitude of the order of 0.5 to 5 mm measured at the level of a rectilinear portion TR, the locating telemeter provides to the control device 7 an information corresponding to the detection of one wave. Then as a function of this information the device 7 determines the presence and the location with respect to the profile P of a curvilinear portion TC met by the laser beam.

It is in particular for that purpose that the programmable device 7 is provided with a memory 7M and with first calculation means 71. In fact the device 7 may be constituted by a personal computer of industrial type or preferably by a conventional automaton constituted by electronic cards inserted on a mother-card itself disposed in the cabinet 9. Each card being assigned to a predetermined control may comprise a processor, read-only and random access memories, analog and digital interfaces for the acquisition and the emission of data, power interfaces with for example electric pilot relays.

Moreover, the memory 7M is provided to record the relative co-ordinates of points of passage distributed over the curvilinear portion TC defined by each wave OP or OP' crossed by the welding profile P. With the illustrated machine 1, a given profile P crosses one single type of wave only, namely a small wave (OP) or a big wave (OP'). Therefore the coordinates of points of passage distributed on two shapes or types of waves only should be stored in the memory 7M of the control device. The latter is connected to a bistable selector switch 87 owing to which the wave type hence the curvilinear portion TC present on the profile P to be welded is indicated to the device 7. However it may be contemplated that the co-ordinates of the points of passage of a greater number of different shapes of portions TC be stored in the device 7 and that the latter may determine with the assistance of the first calculation means 71 the location and the shape of each curvilinear portion met on the profile P.

With the expression "relative co-ordinates", one understands that the positions of the points of passage of each stored portion TC are recorded as a function of a reference system similar to XYZ but the origin of which is different. Otherwise said, all the points of passage of a same portion TC have their co-ordinates stored with respect to each other. Therefore the location of these points of passage effected by the first calculation means 71 consists in determining in accordance with information supplied by the locating telemeter 61, the co-ordinates of these points in the same reference system XYZ as the profile P.

According to the example of FIG. 8, twelve points of passage designated at CP1 to CP12 are distributed in the direction T nearly regularly along the curvilinear portion TC defined by a small wave OP. One remarks that the points of passage CP1 and CP12 are the points of junction of the corresponding portion TC with the neighbouring portions of the same profile P. The points of passage for a big wave OP' are substantially similar to those of a small wave.

Once the location mentioned above has been effected, the first calculation means 71 have still to define through circular extrapolation between the neighbouring points of passage of a portion TC (namely CP1 and CP2, CP2 and CP3, . . . , CP11 and CP12, according to the example of FIGS. 8 and 9) a series, i.e. a given number of points which define curves connecting the neighbouring of passage and substantially coinciding with the corresponding curvilinear portion TC.

This circular extrapolation is effected by the first calculation means 71 in a manner similar to that of a machine-tool with a digital control. Each one of these curves is broken up in a number of points corresponding to successive positions of the torch 40 during its displacement at the level of the curvilinear portion TC it meets. The space between the points of the extrapolated curves defines the accurateness of the pitch between two successive positions of the torch 40 which may be obtained with the displacement system 5. Then the circular interpolation or extrapolation consists in finding for a constant displacement speed vector of the torch 40, the radius of a circle or of a curve one sector of an arc thereof connecting both chosen points of passage substantially coincides with the corresponding part of the curvilinear portion TC. Otherwise said, the first calculation means 71 determine in accordance with a constant displacement speed of the torch 40, with a pitch defined between the successive positions of the latter and the position of both points of passage located with respect to the remainder of the profile P, the radius and the angle which define an arc of a circle or curve approximately coinciding with the corresponding portion of the chosen portion TC or at least appropriate for the welding to be effected on this section of portion. Referring to FIGS. 8 and 9 one understands that this circular extrapolation permits to define the position of each one of the points located between the points of passage CP1 and CP12 which are visible on FIG. 9 and which follow at a nearly constant distance the shape of the wave OP. The displacement velocity of the torch 40 at the level of a curvilinear portion TC may be of the order of 2.5 to 3.5 mm per second.

It should be noted here that if the displacement velocity of the torch 40 is not equal to the value chosen for clearing a curvilinear portion downstream of this portion according to the sense and of the direction of the path of travel T, one provides at the level of the preceding portion of the profile P, a zone for the adjustment of this speed. Thus according to the illustrated example the displacement speed of the torch 40 is of the order of 6 to 10 mm per second at the level of the rectilinear portions. Therefore since each curvilinear portion TC is preceded and followed according to the sense and the direction of the path of travel T by a rectilinear portion TR, a zone of deceleration and a zone of acceleration are provided on either side of each wave met by the profile. As one will explain it subsequently these acceleration and deceleration zones of the profile P also permit to adjust the inclination of the torch 40 with respect to the profile P to be welded.

With reference again to FIGS. 1, 4 and 5 will be described the structural elements allowing the machine 1 to obtain that the displacement system 5 causes one of the successive positions of the torch 40 at the level of a given curvilinear portion TC to correspond to each one of the points of the curves defined by the first calculation means 71.

Here the carriage 3 comprises a frame essentially constituted by two cross members 31 and 32 preferably made from a light alloy such for example as aluminium. The frame constituted by the cross members 31 and 32 is guided on a stationary support 2 in the direction of the axis X and displaced by a first drive member 51 along the path of travel T. Furthermore the torch 40 is made fast to the carriage 3 and more specifically to the cross member 31 with the assistance of a plate 33 itself mounted in sliding relationship onto the cross member 31. More specifically a slideway with columns 34 the axis of sliding of which is substantially parallel to the reference axis Y is fastened onto the cross member 3 through the medium of a screwed right-angled bracket 35. The slideway 34 exhibits nearly the shape of a gallows and is preferably made from a light alloy such as aluminium. The plate 33 is slidably mounted and guided on the gallows of the slideway 34 through the medium of a pair of guide steel columns 343. The guide columns 343 are oriented in the direction of the axis Y and disposed on either side of a threaded drive shaft 523 oriented along Y and mounted for rotation on the gallows of the slideway 34. This shaft 523 is screwed through a threaded or ball socket (not shown) fastened onto the plate 33. Therefore any rotation in a given direction of the shaft 523 causes a sliding of the plate 33 in the corresponding direction along Y hence of the torch 40. The drive member 523 as well as a second drive member 52 to which this shaft is made fast for rotation form part of the drive system 5 of the machine 1. According to the illustrated example the first drive member 51 is fastened onto the cross member 31 of the carriage 3 and co-operates with the stationary support 2 in order to displace this carriage as this will be better explained subsequently.

According to the illustrated example the first and second drive members are constituted by brushless electric step motors of the hybrid type.

More precisely it will be advantageous to use step motors having a resolution of the order of 200 pitches per revolution hence with a minimum angle of rotation of 1.8°. The current per phase applicable to such a motor is a rectified and filtered direct current. This current is determined in accordance with the torque a motor should be capable of developing and its feeding may be effected through a bipolar control with frequency chopping supplying current under a voltage of nearly 28 V at each one of the windings of this motor.

In view of what has just been said, one understands well that the torch 40 may be displaced along Y with respect to the parts P1 and P2 with the assistance of the drive member 52 which constitutes the elevation member of the torch 40. Since the motor 51 permits the displacement of the carriage 3 in the direction T, this motor ensures the drive of the torch 40 along the axis X. Since the first calculation means 71 are connected to and control the drive system 5 hence form part of the elevation member 52 and of the motor 51 so-called feed motor, the machine 1 may displace the torch 40 to any point whatsoever of the envelope of the profile P parallel to the plane XY so that the free end of this torch may follow the profile P which is comprised in this envelope by combining the motions along X and Y caused by the drive system 5.

Furthermore a sliding element 36 is interposed between the plate 33 of the carriage 3 and the torch 40. This sliding element comprises like the slideway 34 two steel guide columns 363 and a threaded steel drive shaft 536. However the guide columns 363 and the drive shaft 536 are oriented in nearly parallel relation to the axis Z, i.e. perpendicularly to the plane XY. This direction substantially parallel to the axis Z and in which the element 36 permits to guide the torch 40 in sliding relationship is called the tracking direction. This guiding is obtained with the assistance of a lug 364 onto which the torch 40 is mounted which possesses a threaded or ball socket (not shown) inside of which the drive shaft 536 is screwed. One sees well on FIG. 5 that the guide columns 363 of the element 36 are accommodated in corresponding bores of the lug 364 in order to guide the latter in their longitudinal direction. It is then clear that any rotation in one direction or in the other one of the drive bar 536 results in a sliding along the axis Z of the torch 40 and this in a direction corresponding to the direction of rotation and to the pitch of the threading of the bar 536.

For that purpose of the drive system 5 comprises a third drive member 53 which is fastened onto the gallows owing to which the shaft 536 is mounted for rotation. This shaft 536 is made fast to for rotation with the third drive member 53. This drive member 53 is advantageously constituted by an electric step motor similar to those which have been described above.

But contrary to the members 51 and 52, the member 53 is arranged so as to carry along the lug 364 hence the torch 40 at least when the latter is displaced at the level of a rectilinear portion TR of the profile P on either side of this profile in the tracking direction alternately in one direction and then in the opposite direction. In other words, the drive member 53 causes a motion of the torch 40 such as the latter describes a wavy path of travel in a plane parallel to the plane XZ and the undulations of which have an amplitude of a few millimeters at most and preferably of the order of 0.3 mm.

Moreover the detection means 6 comprise a tracking telemeter 63 with which the member 53 is interlocked in follow-up relationship. The telemeter 63 is made fast in the direction of Z to the torch 40 and to the carriage 3 in the direction X. According to the illustrated example this telemeter 63 is nearly identical with the locating telemeter 61 with the exception that it effects a measurement in a direction MS nearly parallel to the direction ML. The tracking telemeter 63 is apt to sense the presence of the profile P being plumb with the torch 40 owing to the measurement of a difference of the distance between its sensing head and the point of reflection of the laser beam emitted by this head. Now as one has explained it above since the metal sheets P1 and P2 are lap-welded, the latter form at the level of the profile P a level land substantially equal to the thickness of the top part in the direction Y. In fact each variation of the distance measured by the telemeter 63 which is substantially equal to or higher than the dimension of the level land formed by both parts P1 and P2 at the level of the profile P allows the detection head and the control box of the tracking telemeter 63 to generate a signal indicating to the third drive member 53 that the torch 40 has just moved past the position plumb with this profile P. With this third drive member 53 being interlocked in follow-up relationship with the tracking telemeter 63, the direction of the torch 40 being driven by this member 53 is reversed. Such an interlocking in follow-up relationship permits to the torch 40 to follow the profile P with accuracy and to avoid the deviations of this torch in the direction of Z. One should note here that according to the illustrated embodiment the step motor 53 results in a back-and-forth motion of the torch 40 at the level of the rectilinear portions TR only and does not operate at the level of the curvilinear portions TC although this is perfectly possible.

Now the structural elements of the machine 1 which permit to automatically adjust the orientation of the torch 40 will be described. According to the illustrated embodiment, the torch 40 is mounted on the carriage 3 through the medium of a directional swivelling joint 37. More precisely the directional swivelling joint 37 connects the torch 40 to one portion of the lug 364 which exhibits the shape of a U as one sees it well on FIG. 4. The swivelling joint 37 comprises a shaft 372 mounted for rotation between both legs defined by the U-shaped portion of the leg 364. A piece 38 which will be described subsequently and on which the torch 40 is mounted, is made fast to for rotation with the shaft 372. Thus the welding torch 40 may tilt about an axis substantially parallel to Z. A preferably toothed pulley 537 is also made fast to for rotation with the axis 372. This pulley 572 is connected to another possibly toothed pulley 574 by a preferably toothed belt 576. One sees in particular on FIG. 1 that the pulley 574 is mounted for rotation about an axis substantially parallel to Z on one portion of the lug 364 forming a supporting plate and extending in a plane approximately parallel to the plane XY. It is on this supporting plate of the lug 364 that a fourth drive member 54 (FIG. 5) is fastened. Here again the drive member 54 is constituted by a step motor similar to those designated at 51, 52 and 53. From FIG. 5 one understands that the output shaft substantially parallel to Z of the drive motor 54 is made fast to for rotation with the pulley 574. In fact when the motor 54 rotates in one direction or in the other one, the belt 576 rotates the pulley 537 and the piece 38 in a corresponding direction. This rotation of the piece 38 results in a corresponding change of the orientation of the torch 40 with respect to the stationary support 2.

Of course the drive member 54, the pulleys 574 and 537 as well as the belt 576 form part of the drive system 5 of the machine 1. Therefore the member 54 is operated by the control device 7 in order that the torch 40 be oriented in a suitable manner about the axis 372 parallel to the reference axis Z with respect to the profile P. This orientation of the torch 40 corresponds to the angle KA visible on FIG. 2. Although this has not been shown, at the level of the rectilinear portions TR of the profile P and when the feed speed of the carriage 3 is constant, this orientation KA will be of the order of 40° with respect to the axis Y. The orientation KA of the torch 40 is rightened until forming a zero angle with respect to the axis Y at that level of the parts of the portion TR where the speed of the carriage 3 undergoes a deceleration. Similarly the orientation KA of the torch 40 is gradually changed at the level of those parts of the portion TR where the carriage 3 accelerates until the longitudinal axis of the torch forms in a projection in a plane parallel to XY, an angle of about 40° with respect to the axis Y.

Referring to FIGS. 8 and 9 one understands that the control device 7 acts upon the drive member 54 so that the projection explained hereabove of the longitudinal axis of the torch 40 be maintained with an approximately constant orientation KA at the level of the curvilinear portions TC with respect to the tangent to the corresponding curve defined by the first calculation means 71. In effect one sees that at the level of the points of junction CP1 and CP12, the projections of the longitudinal axis of the torch 40 designated at 401 and 412, respectively, are nearly parallel to Y. The projections 402 to 411 are approximately perpendicular to the tangent to the profile P at the level of their corresponding point of passage CP2 to CP11, respectively.

On FIG. 7, the reference numeral 64 designates an adjusting sensor forming part of the detection means 6. This adjusting sensor which is disposed here within a stationary section 42 of the welding equipment 4 is apt to determine a spacing between the profile P and the torch 40. Now it appears from FIGS. 1, 4 and 5 that this torch is mounted for sliding along a substantially parallel axis Y with respect to the carriage 3. In fact it is through the medium of the piece 38 mentioned above and which has the shape of a slideway gallows similar to the spacing slideway designated at 34 that the torch 40 is mounted for sliding in a direction MR parallel to Y and called "adjusting" direction.

More specifically the adjusting slideway of which forms part the gallows 38 comprises a threaded shaft 384 mounted for rotation onto the slideway gallows 38. The threaded portion of the shaft 384 is screwed and extends through the medium of a stationary threaded bush, through an arm 385. This arm 385 is mounted onto the gallows 38 so that any rotation of the shaft 384 results in a displacement of the latter in a corresponding direction along the adjusting direction MR. Now one sees well that the torch 40 is fastened with the assistance of an adjusting bolt 394 onto a tongue 39 itself screwed onto the arm 385. Therefore each displacement along MR of the arm 385 causes a corresponding displacement of the torch 40. On the other hand one sees that a fifth drive member 55 of the system 5 is mounted onto the slideway gallows 38. Here again this member 55 is constituted by a step motor the output shaft of which is made fast to for rotation with the shaft 384. This drive member 55 is interlocked in follow-up relationship with the adjusting sensor 64 so as to keep the spacing between the useful end, i.e. the electrode of the torch 40 and the profile P substantially constant in accordance with a predetermined set value.

According to the illustrated example the torch 40 is an electric arc welding torch. In this case the adjusting sensor 64 may be constituted by a voltmeter apt to determine the spacing between the profile P and the torch 40 from the voltage of the arc produced by this torch. Then the set value is a predetermined value of the voltage of the welding arc. For example the interlocking in follow-up relationship of the fifth drive member 55 may maintain the voltage of the arc generated by the torch 40 at a set value of the order of 10 volts. One should note that the slideway 38 is fitted with a stroke end limiting sensors 638 adapted to interrupt the sliding of the arm 385 along MR when the latter reaches a so-called resetting position.

One should note here that the adjusting bolt 394 which extends nearly parallel to the axis X permits to adjust the inclination of the longitudinal axis of the torch 40 in a plane parallel to the plane YZ. This inclination designated at KF on FIG. 2 is maintained by the tightening of the bolt 394 and does not change during the operation of the machine 1.

Referring again to FIG. 7 one sees that the control device comprises means 72 "parallel" to those which are designated at 71 and called second calculation means. The second calculation means 72 are provided to be acted upon when the means 71 are at a stop. Otherwise said these means 72 have to perform the function of managing the displacements of the torch 40 alternately with the means 71 at the level of each one of the rectilinear portions TR of the profile P. In fact these means 72 are in general similar to the means 71 with the exception that they determine the co-ordinates of the successive points along which the torch 40 is displaced at the level of a portion TR and this not by a curvilinear extrapolation but by a linear extrapolation. These second calculation means 72 are thus activated as long as the head 61 of the locating telemeter of the detection means 6 does not effect a measurement corresponding to the presence of a wave OP or OP' within the profile P. The starting point from which the second calculation means 72 determine the coordinates of aligned points substantially coinciding with the rectilinear portion TR along which the torch 40 is displaced, is determined either by hand or during the initialization or resetting of the machine 1 hence before welding or as according to the illustrated embodiment with the assistance of the sensor 64.

Before turning to the description of the stationary support 2 as well as of the operation of the machine 1 one should note that the latter comprises a hood 103 fastened onto the cross members 31 and 32 of the frame of the carriage 3 and protecting most of the functional members mounted on this carriage. Furthermore, a handling hand-grip 133 is also fastened onto the frame of the carriage 3 and more precisely on one face thereof opposite to the torch 40. This grip 133 permits the handling and the installation of the machine 1 as well as the manual displacement of the carriage 3 with respect to the stationary support 2.

Figure 4:
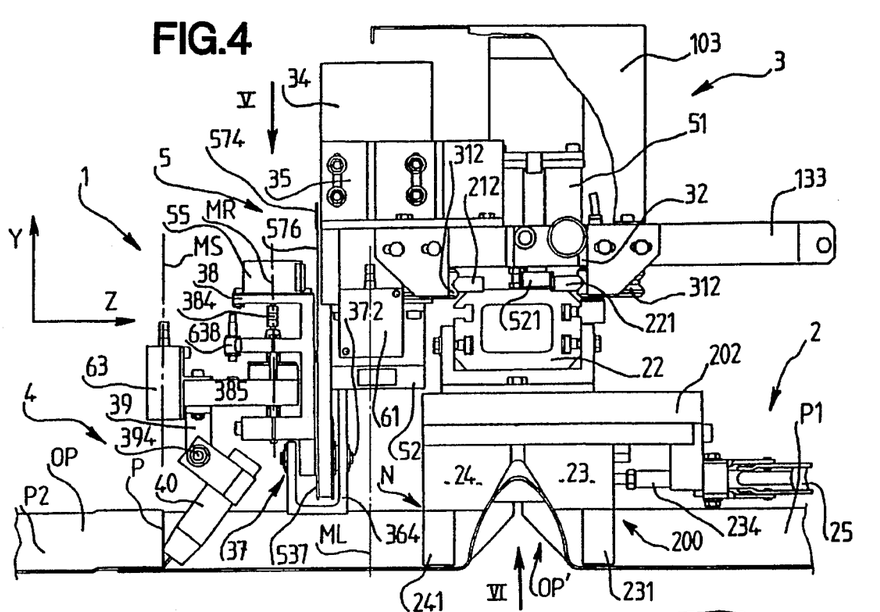
FIG. 4 is a view along the arrow IV of FIG. 1.
Figure 5:
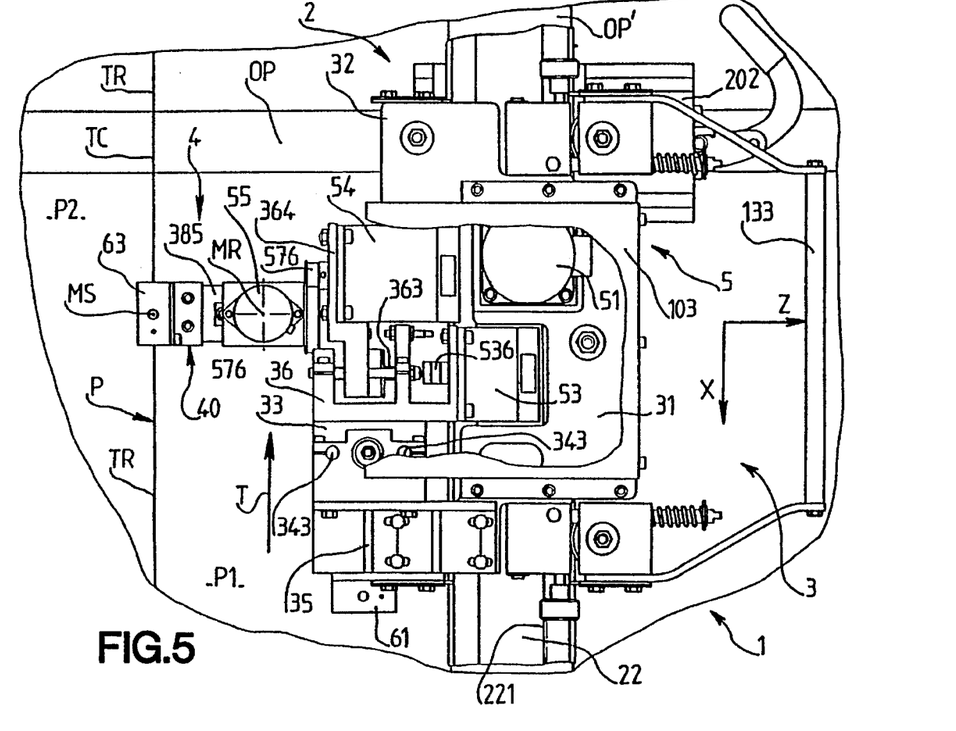
FIG. 5 is a partial view along the arrow V of FIG. 4.

It also appears from FIGS. 1, 4 and 5 that the stationary support is constituted essentially by a rail the longitudinal direction of which coincides with the feed path of travel T of the carriage. Here the rail 22 is thus rectilinear and substantially parallel to the axis X. This rail 22 is constituted by a section with a length corresponding to that of the profile P to be welded and of the order of three meters. A toothed rack 221 visible on FIGS. 4 and 5 is fastened to the rail 22 in parallel relation to X. This toothed rack 221 extends throughout the length of the rail 22 and co-operates with a toothed pinion 521 made fast to for rotation with the first drive member 51 previously described. The toothed pinion 521 the axis of rotation of which is substantially parallel to Y is in engagement with the teeth of the toothed rack 221 so that if the motor 51 is actuated, the carriage 3 is displaced in a corresponding direction along the rail 22. This displacement of the carriage 3 is guided with the assistance of two pairs of rollers 322 and 312 mounted for rotation on axles parallel to Y and made fast to the cross members 32 and 31, respectively, of the frame of the carriage 3. Thus a roller 312 and a roller 322 are disposed on each longitudinal side of the rail 22. Each roller 312 and 322 comprises a V-shaped circular groove. One sees on FIG. 4 that the longitudinal external face of the toothed rack 221 which is fastened onto the rail 22 has a shape corresponding to the peripheral groove of the rollers 312 and 321. In parallel relation to X, a strip 212 is fastened onto the rail 22 and itself also possesses a V-shaped surface corresponding to that of the peripheral groove of the rollers 312 and 322. The guide strip constituted by the external face of the toothed rack 221 as well as the strip 212 co-operate each one with a roller 312 and 321 so as to guide the carriage 3 along T with respect to the stationary support 2 hence to the parts P1 and P2.

On the figures the general reference numeral 200 designates a quick anchoring mechanism. In fact the stationary support 2 comprises several of these quick anchoring mechanisms 200 owing to which this support may be positioned and fastened in a removable manner onto at least one of the parts to be assembled.

As the cases may be, the mechanisms 200 for the quick anchoring of the stationary support 2 may be constituted by suction-cups, magnetic pads or the like. On the contrary according to the illustrated embodiment, each one of this anchoring mechanisms 200 is constituted by a blocking tong apt to co-operate with a node N to immobilize the machine 1 with respect to the parts P1 and P2 to be welded.

More precisely the mechanism or tong 200 comprises a plate 202 fastened for example by screwing onto the rail 22. A stationary jaw 24 projects from that face of the plate 202 which is in front of the parts to be welded. The stationary jaw 24 comprises two cylindrical positioning studs 241 and 242 which extend in nearly parallel relation to Y. The free end of each one of these studs 241 and 242 rests upon a flat surface parallel to the plane XZ of at least one of the parts to be welded and thus constitutes supporting feet. Each mechanism 200 also comprises a movable jaw 23 mounted for sliding with respect to the plate 202 in a direction parallel to the axis Z. The movable jaw 23 which has a shape nearly similar to that of the stationary jaw 24 itself also possesses two cylindrical studs or feet 231 and 232. A rod 234 connects the movable jaw 23 to a tightening hand-grip 25. This handle is mounted onto the plate 202 so that it may displace the movable jaw 23 towards the stationary jaw 24 in a direction parallel to Z and lock itself through buttressing in a predetermined position when the mechanism 200 is tightened. This clamping is obtained when a node N is caught as in a vice by the movable and stationary jaws 23, 24 and when the hand-grip 25 is immobilized by buttressing. One understands that the mechanism 200 which has just been described is particularly easy to be installed and to be removed and that the latter secures a firm and accurate positioning of the machine 1 on the parts to be welded.

In addition one sees on FIG. 7 that the carriage 3 possesses a sensor 26 forming part of the detection means 6. In practical use one provides one or two sensors 26 for example consisting of induced current proximity detectors and acting as stroke end limiting sensors apt to de-energize the first member 51 when the carriage 3 arrives near one of the longitudinal ends of the rail 22. Similarly all the axes of displacement of the torch 40 with respect to the carriage are fitted with at least one stroke end limiting or initiation sensor.

As one has stated it previously, the welding equipment 4 here is an arc welding set. However it may be contemplated to provide in the machine 1 according to the invention other types of welding, brazing or the like sets as long as the latter allow to automatically provide weld points and/or beads.

In the present case it is imperative that the welding of the parts P1 and P2 be effected without excessive melting or fluxing of the latter. Therefore the chosen torch 40 is of the type permitting to carry out a weld without any filler material and is made under a flux of inert gas. For that purpose a tungsten electrode is provided at the useful end of the torch 40. This electrode is supplied with a current having an intensity of the order of 70 to 140 A in the form of pulses generated with a frequency of nearly 16 Hz. One understands when looking at FIG. 7 that the torch 40 is connected to an outside source of industrial electric current S42 through the medium of a stationary box or part 42 to which are connected a source of inert gas G and a source of cooling fluid SF (water for example). To obtain a good movablity of the machine 1, the box 42 is connected to the torch 40 by a flexible or umbilical cord inside of which are arranged the ducts and cables for the supply of the torch 40 with cooling fluid, inert gas and electric current. This cord has a length determined in accordance with the contemplated use of the machine 1, which in the present case is about 10 m.

The box 42 which may be fed by a source S42 with a voltage of 220 V, 320 V or 440 V and a frequency of 50 or 60 Hz for example in particular comprises a supply undulator capable of generating a current feeding the torch 40, the intensity of which may reach 160 A for example. For the initiation of the welds, one may provide that the current conversion box 42 may generate a current with high frequency impulses first causing sparks ionizing the inert gas which is injected towards the non consumable electrode of the torch in order that a welding arc appears between this torch 40 and the profile P. In this case the flexible cords, electrical apparatus and the like should be shielded and protected from the effects of such a high frequency current. Otherwise the arc may be created and controlled upon its appearance by contact with short-circuiting between the electrode and the parts to be welded and this under the control of the sensor 64. One should also provide at the level of the box 42 valves permitting to adjust and to interrupt the supply of the torch 40 with inert gas and in the case where this torch is cooled by a fluid such as water, a similar valve interposed between this torch and the source SF.

Still on FIG. 7 one sees that a flexible cord connects the box of the welding equipment 4 to the cabinet 9. Such a cord may have a substantial length for example of from 30 to 60 m. In order to facilitate the handling of the machine 1, the cabinet 9 may be mounted onto caster wheels 99. Similarly the box 42 may also be mounted onto caster wheels. It is on the cabinet 9 that the main board for the control of the machine 1 by an operator is installed. One should note here that possibly the structural element installed in the cabinet 9 may be fed separately for example by an alternating current source S97 similar to the source R42 described above. However it is imperative that the current feeding the programmable control device 7 be a rectified and filtered current.

According to the illustrated example, a control button 10 with two positions 91 permits to obtain an automatic or manual operation of the machine 1. The button 92 is a a tristable switch which permits to control the advancing of the torch 40 along T in one direction or in the other one. The buttons 93, 95 and 96 are similar to the button 92 and act upon the motor 51, the motor 52 and the motor 54, respectively. The button 94 is a button for an emergency stop of the operation of the machine 1.

One should note that if the emergency stop button 94 is actuated, the machine 1 effects a resetting consisting in placing the torch 40 again in a predetermined so-called initialization position.

On FIG. 7 the reference numeral 8 designates a transportable case for the remote control of the machine 1. Like the cabinet 9, this case 8 is provided with an emergency stop button 88. To enable the operator in charge of the machine 1 to remote-control the latter from the case 4 and cabinet 9, the case 8 is connected to the latter by a flexible or umbilical cord similar to those which have been described above, with a length of the order of 15 m for example.

On the front face of the case 8, the button 83 is a bistable switch which permits to operate the start and the stop of the machine 1. The button 82 is similar to the button 92 and therefore permits to control the manual or automatic operation of the machine 1. The activation of the welding may be controlled by the button 84. The knobs 85 and 86 respectively are a knob operating the placement of the machine in the above-mentioned position through the initialization or disengagement of the torch 40 and a member for the checking of the operations of the lamps of the machine 1. The knob 86 permits to determine the wave type (OP or OP') to be welded. Once the support 2 is mounted in locked condition with respect to the parts P1 and P2, the carriage 3 is mounted onto the support 2 and the welding set 4, the cabinet 9 and the other elements of the machine 1 are energized and the supplies with auxiliary fluids (inert and cooling gases) are opened, the operation of the machine 1 may begin.

Then four modes of operation of the machine 1 are possible. A program adapted to the operation of the machine 1 under each one of these modes is stored in the control device 7.

The first one of the operating modes of the machine 1 is an entirely automatized operation permitting to effect a continuous weld along the profile P. The different parameters of the welding to be effected along the profile P are indicated to the device 7 with the assistance of the selection knobs described above. In particular, the type of waves, the welding position and all the parameters necessary for the operation of the machine 1 are assigned.

Then the operator actuates the cycle starting knob thereby causing the initialization or resetting of the position of the carriage 3 and of the torch 40 for all guidings thereof. In particular the elevation along Y, the angle of orientation of the torch about an axis parallel to Z and a central tracking position S. Then the operator has to check whether the supplies of the machine 1 as well as its grounding are properly effected. Then the welding operation proper may begin. During this operation according as the torch lies at the level of a rectilinear portion TR or of a curvilinear portion TC, the second calculation means 72 or the first calculation means 71 exclusively of the device 7 manage the displacements of the torch 40, in the manner which has been described above.

The interruption of the welding along the profile P may be controlled either by the operator or when one of the stroke end limiting sensors 26 of the carriage 3 with respect to the support 2 detects the presence of this carriage at the end of the rail. The welding is then interrupted and the different guide axes of the torch 40 and positions of the movable elements of the machine 1 are automatically placed in the rest and initialization position explained above.

The second operating mode of the machine 1 permits to carry out discontinuous welds for example for a pre-connection of the metal sheets onto the inserts. This mode is substantially identical with the one which has just been explained with the exception that the weld type selector should be placed on the "discontinuous weld" position. For both operating modes which have just been mentioned, the machine 1 effects the initiation of the welding right in the metal sheet as opposed to the operating mode which will be described now, which requires an in-the-fly initiation on a bead already made and which one desires to deal with again or to repair.

The third operating mode of the machine 1 is a mode permitting to repair a weld. This mode consists in resuming a welding operation previously interrupted pursuant to a hazard. The initiation of the repairing weld is effected at a low speed and on a weld bead previously made. This is necessary to melt again the end of the bead already made and to connect latter at the bead level. This third mode of operation furthermore is substantially identical to the two other ones.

It should however be noted that in such a case the carriage 3 has been stopped in a random position which is therefore not recognized by the machine 1. In fact a resetting of the guide axes of the latter should imperatively be effected as soon as the machine 1 has been energized again. Then the carriage 3 is displaced along T up to the place where the welding should be resumed. More specifically one places the torch 40 to be plumb with the rectilinear portion TR of the profile P located just downstream of the place where the foregoing welding has been interrupted. This permits to the first calculation means 71 to take up again from the detection by the locating telemeter 61, their circular extrapolation or interpolation calculations which have been described above.

The selection of this cycle involves to place the corresponding knob on the "repair" position. One should remark here that the welding start pulse knob should be activated only according to this mode of repairing welding and be de-energized according to the other modes.

Lastly, a fourth mode of operation of the machine 1 permits to obtain a displacement of the torch 40 without the latter effecting a welding. It suffices therefor to place the suitable selector in the position without welding. At this time the machine 1 may simulate either one of the three first modes of operation which have been described hereabove.

The invention is of course not at all limited to the embodiments which have just been described but comprises all the equivalents of the illustrated technical means as well as their combinations if the latter are effected according to its gist.

Among others, the telemeters 61 and 63 as well as the detection sensors such as the one which is designated at 26 will not imperatively be laser telemeters. Other types of sensors preferably without any contact may also be used.

For example in the case where the measurement or detection to be effected is made with respect to a metallic part, inductive proximity detectors could be used whereas if the movable part is made from an insulating material, a capacitive sensor could for example be used. For the linear displacements of small amplitude, the step motors may be replaced with jacks or the like as for example in the case of the tracking drive member 53 and of the elevation drive member 52.

Owing to the machine 1 which has just been described, one understands that a weld with a high quality may be obtained in a quick and precise manner while this minimizing the human intervenings and the costs for the obtaining of the assembly of corresponding parts.

What is claimed is:

1. An automatic machine for the in situ assembly of at least two metallic parts by welding along a profile (P) common to the parts and comprising a support stationary with respect to the parts, a carriage movably mounted on the support and guided along a feed path of travel (T), welding equipment with a torch movably mounted and guided on the carriage, a displacement system for the displacement of the carriage and the torch with respect to the support, means for the detection of the position of the torch with respect to the parts, and a programmable control device connected to the detection means and operating the displacement system and the welding equipment such that welding is effected by the torch along the common profile (p), the detection means comprising a locating telemeter supported by the carriage independently of the torch for measuring a chosen distance between the machine and one of the parts, the profile having at least one curvilinear portion (TC) at the level of which the chosen distance is outside a given range, the control device being provided with a memory wherein are recorded the coordinates of points of passage on the profile as a function of the locating telemeter, the control device including means for defining through circular extrapolation between the neighboring points of passage a series of curves connecting these points and coinciding substantially with the curvilinear portion (TC) in order that the displacement system makes one of the successive positions of the torch at the level of the curvilinear portion (TC) correspond to a given number of curves.

2. A machine according to claim 1 wherein the torch is made fast to a plate mounted for sliding on the carriage in a direction of elevation (Y) substantially parallel to the distance measured by the locating telemeter and perpendicular to the feed path of travel (T), the drive system comprising a first drive member cooperating with the stationary support and made fast to the carriage in order to displace the carriage along the path of travel (T) as well as a second drive member made fast to the carriage and cooperating with the plate so as to displace the plate and the torch along the direction of elevation (Y).

3. A machine according to claim 2 wherein the control device includes second calculation means which operate alternately with the first means when the torch is located at the level of a rectilinear portion of the profile (P) and determine a series of aligned points corresponding to the successive positions of the torch at the level of the rectilinear portion (TR) through linear extrapolation and in accordance with a position for the initialization of the displacement of the torch.

4. A machine according to claim 2 wherein a toothed rack cooperating with a pinion disposed for rotation with the first drive member as well as at least one guide strip cooperating with rollers mounted for rotation on the carriage are fastened to the rail along its longitudinal direction.

5. A machine according to claim 1 wherein the torch is mounted on the carriage through an element sliding in a tracking direction perpendicular to the feed path of travel (T) as well as to the distance (Y) measured by the locating telemeter, the displacement system including a third drive member arranged so as to drive the torch on either side of the profile in the tracking direction (Z) alternately in one direction and then in the opposite direction and the detection means comprise a tracking telemeter made fast to the torch for detecting the presence of the profile (P) being plumb with the torch, the third drive member being interlocked in follow-up relationship with the tracking telemeter in order that at each detection by the tracking telemeter of the profile, the direction of drive of the torch by the third drive member is reversed.

6. A machine according to claim 5 wherein the locating and tracking telemeters comprise a detection head mounted on the carriage and provided with an emitter as well as with a receiver of laser beams and a control box connecting the control device to the head, the head being disposed so that the beams are reflected by one or the other one of the parts to be assembled and that the distance to be measured or the presence to be sensed is determined according to the diameter and/or the wavelength of the reflected beams.

7. A machine according to claim 1 wherein the torch is moreover mounted on the carriage through a directional swivelling joint, the swivelling joint permitting rotation of the torch with respect to the stationary support about an axis (Z) substantially perpendicular to the feed path of travel (T) and to the distance measured by the locating telemeter (ML), and the displacement system comprises a fourth drive member made fast to the swivelling joint and cooperating with the torch in order that the orientation of the torch at the level of each point of the curvilinear portion (TC) of the profile (P) is kept approximately constant with respect to the tangent to the corresponding curve defined by the first calculation means and at the level of each rectilinear portion (TR).

8. A machine according to claim 1 wherein the detection means comprise an adjusting sensor for determining a spacing between the profile (P) and the torch, the torch being mounted onto a slideway made fast to the carriage for sliding in an adjusting direction (MR) in a plane substantially parallel to the feed path of travel (T) and to the distance measured by the locating telemeter, the displacement system comprising a fifth drive member itself made fast to the slideway and interlocked in follow-up relationship with the adjusting sensor so as to keep the spacing substantially constant in accordance with a predetermined set value.

9. A machine according to claim 8 wherein the adjusting sensor comprises a voltmeter arranged to determine the spacing between the profile (P) and the torch according to the voltage of the arc produced by the torch, the set value being a predetermined value of the voltage of the welding arc.

10. A machine according to claim 1 wherein the torch is an electric arc welding torch without any filler material and with a flux of inert gas.

11. A machine according to claim 1 wherein the stationary support comprises a quick anchoring mechanism for positioning and fastening the support in a removable manner onto at least one of the parts to be assembled.

12. A machine according to claim 1 wherein the stationary Support comprises a rail having a longitudinal direction coinciding with the feed path of travel (T).

13. A machine according to claim 1 wherein the control device and a control board of the machine are grouped in a movable cabinet connected through flexible cords to a remote-control desk and to the carriage and to a stationary section of the welding equipment to which the torch is also connected by a flexible cord.

14. A machine according to claim 1 wherein the locating telemeter measures a distance of the one of the parts from the telemeter at a location spaced from the profile in a transverse direction.

* * * * *